(No Model.)

J. BALL.
PENDULUM SCALES.

No. 267,393. Patented Nov. 14, 1882.

Witnesses:

Jacob Ball
Inventor
By Atty.

UNITED STATES PATENT OFFICE.

JACOB BALL, OF GREENVILLE, MICHIGAN.

PENDULUM-SCALE.

SPECIFICATION forming part of Letters Patent No. 267,393, dated November 14, 1882.

Application filed June 2, 1882. (No model.)

*To all whom it may concern:*

Be it known that I, JACOB BALL, a subject of Great Britain, residing at Greenville, in the county of Montcalm and State of Michigan, have invented certain new and useful Improvements in Scales; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of scales which are intended for weighing letters and other small parcels or quantities of substances; and it consists in certain features hereinafter described, and specifically set forth in the claims.

Figure 1:
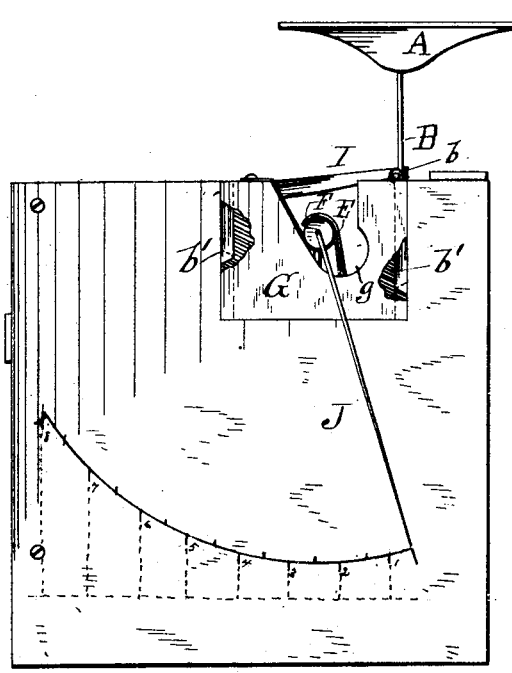
Figure 2:
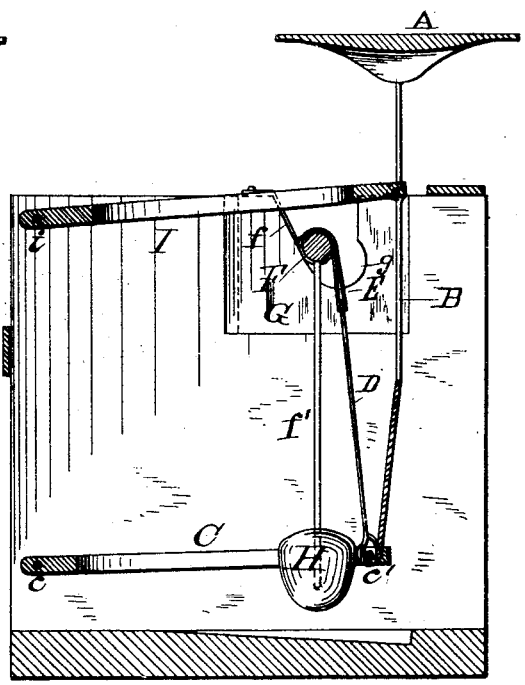

Figure 1 is a front elevation of a scale embodying my invention and showing in dotted lines the method of laying off the graduations; and Fig. 2 is a sectional view of the same, the section being central, longitudinal, and vertical; and Fig. 3 is a perspective of a scale of a modified form.

Like letters refer to like parts in each of the figures.

The pan A is supported upon a bifurcated rod, B, each of the bifurcations being provided with a bearing, $b$, and the lower end of the rod resting in a lever, C, pivoted at $c$ to the frame or case of the scale, the front end of this rod being connected by a loop, D, pivotally to the free end of the lever C at $c'$.

At the upper end of the loop D is a strap, E, which is wound about a shaft, F, having at each end a strap, $f$, wound in an opposite direction to that of the strap E, and secured to two fulcrum-blocks, G, having a curved depression, $g$, adapted to permit the rotation therein of the shaft F. These blocks are dovetailed, as shown at $b'$, in the sides of the case.

At the center of the shaft F depends a rod, $f'$, at the outer end of which is located and attached a counter-balance, H, which rests in a slot of the lever C normally.

In the bearings $b$ of the bifurcated rod B is supported pivotally the free end of the lever I, the rear end of which is pivoted at $i$ to the frame or case of the scale, as shown.

At one end of the shaft F is rigidly secured the indicator J, which points to a properly-graduated scale of weights upon or attached to the side of the case, which scale is curved, not in an exact semicircle, but in a manner to agree with the motion of the indicator, which is caused by the peculiar movements of the shaft to which it is attached, which shaft may be termed a "rolling fulcrum." Its operation is such that at or from the zero-mark the center of a circle described by the free end of the indicator is, as the weight depresses the pan, lowered, and, as the weight is removed, elevated, by means of the straps coiled about the shaft or fulcrum.

In operation, the levers I C are constantly parallel with each other, and as a consequence the bifurcated rod is always perpendicular, and therefore the pan secured thereto is level. The counter-balance H is limited in its action in one direction by striking against the end of the slot at the free end of the lever C and in the other direction by striking against the under side or pivoted end of the lever I. As the weight increases the fulcrum-shaft is rotated by means of the central strap, E, and the end straps, $f$, are unwound therefrom, and the fulcrum-shaft travels down the incline of the edges of the depressions formed in the blocks, and the indicator is caused to travel along the scale in proportion to the weight in the pan.

Having described my invention, what I claim as new, and desire to secure by Letters Patent, is—

1. The combination of the levers C I, the bifurcated rod B, resting upon the lower of said levers and pivotally secured to the upper, the loop D, the strap E, the rolling fulcrum-shaft F, the counter-balance shaft H, the straps $ff$, and the indicator J, substantially as shown and described.

2. The combination, with the frame or sides of the scale, of the blocks G, having curved recesses $g$, the straps E $ff$, and the fulcrum-shaft F, the indicator J, and means for operating the fulcrum-shaft, substantially as shown and described.

3. In a scale, the combination, with the rolling fulcrum-shaft, of the straps E $ff$, the levers C I, a counter-balance adapted to swing in the slots of one of the levers and limited in its operation in both directions by striking against said levers, substantially as shown and described.

In testimony whereof I affix my signature in presence of two witnesses.

JACOB BALL.

Witnesses:
  PETER SCHEROTT,
  E. H. JONES.